Aug. 25, 1970     W. G. SHEIRY, JR     3,525,423

MECHANICAL AND HYDRAULIC BRAKE SYSTEM

Filed May 31, 1968     3 Sheets-Sheet 1

INVENTOR.
WILLIAM G. SHEIRY, JR.

BY

ATTORNEY

Aug. 25, 1970  W. G. SHEIRY, JR  3,525,423
MECHANICAL AND HYDRAULIC BRAKE SYSTEM
Filed May 31, 1968  3 Sheets-Sheet 2

INVENTOR.
WILLIAM G. SHEIRY, JR.
BY
ATTORNEY

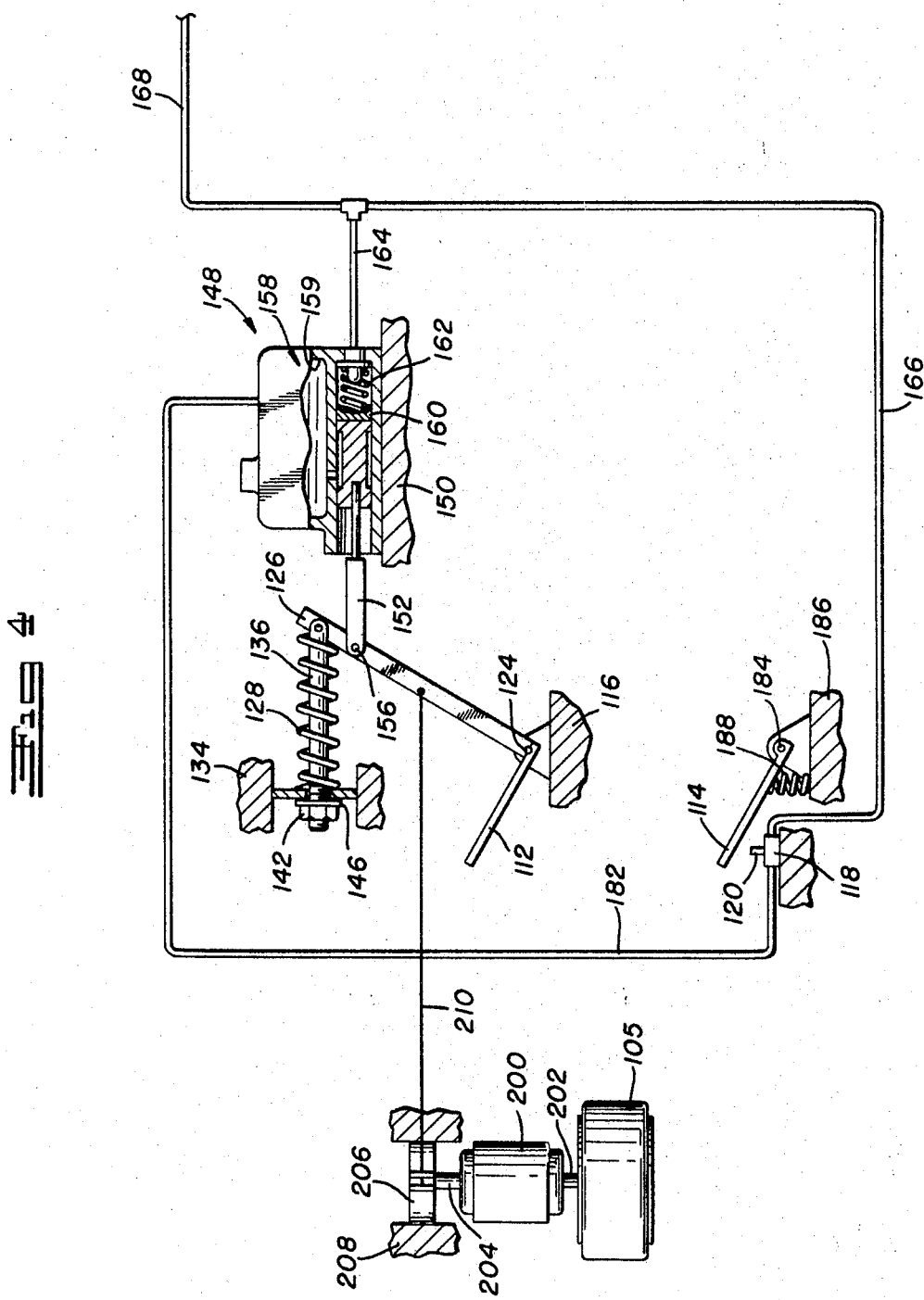

United States Patent Office 3,525,423
Patented Aug. 25, 1970

---

3,525,423
MECHANICAL AND HYDRAULIC BRAKE SYSTEM
William G. Sheiry, Jr., Alsip, Ill., assignor to Eaton Yale & Towne Inc., Cleveland, Ohio, a corporation of Ohio
Filed May 31, 1968, Ser. No. 733,415
Int. Cl. F16d 65/24
U.S. Cl. 188—106                                    1 Claim

ABSTRACT OF THE DISCLOSURE

A brake system for wheeled vehicles, the brake system including the provision of both hydraulic and mechanical actuating means. Normal use of the brake system requires the application of the vehicle brakes through the use of hydraulic pressure, a means is provided for the purpose of hydraulically actuating the brakes to retard the normal movement of the vehicle. The means for applying the hydraulically actuated brakes is also adapted under certain conditions to cause the actuation of the mechanical brakes.

BACKGROUND OF INVENTION

Field of invention

This invention relates to a brake system whereby the application of a parking or emergency brake is effectively controlled.

Discussion of invention

My invention is of particular importance in industrial trucks where it is extremely desirable that a parking brake be applied when a driver leaves his vehicle.

It is also very important to apply an emergency brake in the event of failure of the usual braking system particularly where that braking system is hydraulic.

As a feature of my invention that is of particular importance, I interconnect the standard hydraulic braking system of an industrial truck with mechanism for effecting the application of either a parking brake or an emergency brake as may be required.

As a particularly important feature of my invention, a parking brake may be applied automatically by the driver after the vehicle has been brought to a stop through the application of the usual hydraulic brakes. This action is made so very convenient to the operator that he is not inclined to utilize the parking brake in advance of full stopping of the vehicle.

As a more particular feature of my invention, it is possible to automatically apply the emergency brakes, which can also be the parking brake, in the event of failure of the hydraulic brakes to stop the vehicle. This action taking place automatically during the application of the hydraulic braking system merely through the actuation or release of the control mechanism.

In the preferred embodiment of my invention that I shall describe in this application, I utilize as a heart of the invention, a standard form of master brake hydraulic cylinder which upon movement of the piston within the cylinder causes pressurization of the usual hydraulic brake cylinders. The pedal that moves the piston to apply the brake may be manually actuated or spring actuated and in this application I show a spring actuated pedal. The brakes are applied when the pedal moves the piston a limited distance within the master cylinder. Therefore, upon failure of the hydraulic line connecting the brake cylinder and the master cylinder the piston will be free to move an additional amount. During the movement of this piston which is naturally accompanied by movement of the pedal the pedal will actuate a parking brake or an emergency brake or both, as the case may be.

It will now be appreciated, in view of what has been set forth, that the parking or emergency brake will be applied automatically by the pedal upon failure of the service brake system due to the additional movement that will be imparted to the piston operating in the master cylinder.

As a further feature of my invention I utilize a normally open bypass valve for the circuit between the master cylinder and the brake cylinder and provide means for closing this bypass during normal operation of the hydraulic brake system. Naturally, when the bypass is opened it will be impossible to apply the hydraulic brakes and the piston and pedal will receive that additional movement that results when the service brake system fails, so as to apply the emergency or parking brake. Preferably, I control the valve by a deadman treadle which acts to hold the valve closed when the treadle is depressed, as by the presence of the operator and opens the valve when the operator leaves the vehicle. With the particular arrangement it is possible for the operator to bring about the application of the service brakes after which by withdrawing pressure from the deadman treadle the emergency brake will be automatically applied by the further movement of the pedal and the piston of the master cylinder. In the event the operator falls from the vehicle, the deadman treadle will be moved to open the valve and the master cylinder piston will receive full movement to apply the emergency brake automatically in applications where a spring is utilized for moving the pedal.

It will be now fully appreciated that in my invention there is an automatic application of a parking brake or emergency brake when the deadman treadle is allowed to move.

There is the additional feature that should the hydraulic braking system fail, the parking brake or emergency brake will be automatically applied.

There is still the further feature that when the operator wishes to bring about the parking of the truck he merely allows the service brake to be applied, after which the release of pressure on the deadman treadle applies the parking brake automatically. This ensures, as was earlier indicated, the use of the service brakes to stop a vehicle and the use thereafter of the emergency or parking brake to hold the vehicle in position, thereby not causing the abuse of the parking or emergency brake.

As a further feature of my invention, it can be seen that once the vehicle is brought to a complete stop and the parking brake applied, as above indicated, that the now open bypass valve has relieved the hydraulic pressure in the hydraulic brake system thereby increasing the expected service life of the various components of the hydraulic brake system which are, in the absence of the provision of a bypass valve, subjected to static hydraulic pressure which, as is well known, tends to cause a premature failure of hydraulic parts such as seals and the like.

Having thus set forth the field of invention and enumerated cerain of the features of the present invention, reference will now be made to the accompanying drawings wherein:

FIG. 4 is a schematic illustration of another embodiment of the brake system of the present invention.

DESCRIPTION OF THE PREFERRED EMBODIMENT

Figure 1:
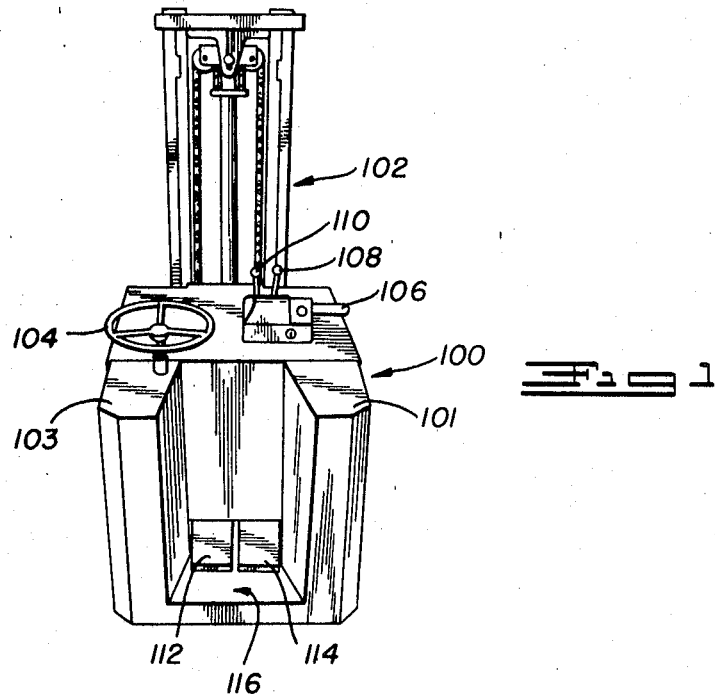
FIG. 1 illustrates a vehicle of the type to which the invention of the present case is particularly adapted.

In FIG. 1 there is shown a vehicle 100, specifically an industrial fork lift truck, to which the brake system of the present invention is particularly adapted.

As can be seen in FIG. 1, the vehicle 100 is provided with an upright 102 for supporting the movement of a pair of load carrying forks. The vehicle is also provided with the normal vehicle control components such as the steering wheel 104 and hand speed and direction control 106 and lever controls 108 and 110 for controlling the vertical movement of the forks along the uprights 102. The vehicle 100 is further provided with a pair of treadle type brake actuating pedals 112 and 114. Although the order may be, of course, reversed, in the illustration shown in FIG. 1 the service brake pedal 112 is used to control the hydraulic actuation of the brakes and the pedal 114, also known as a deadman treadle, is used to apply the parking or emergency brakes of the vehicle 100. During operation of the vehicle 100 an operator normally stands with one foot on each of the pedals 112 and 114 such that the pedals 112 and 124 are fully depressed against a portion 116 of the vehicle 100.

With the pedals 112 and 114 thus depressed against the portion 116 of the vehicle 100, the vehicle may be steered by means of a steering wheel 104 and the forward and reverse direction controlled through the speed and direction control 106; and further, the load carrying forks may be raised and lowered along the support mast 102 through manipulation of the levers 108 and 110. With the vehicle being operated in a forward or reverse direction of travel, the operator may control the braking of the vehicle 100 by removing his weight from the service brake pedal 112 which will, through appropriate linkages to be described with respect to FIG. 2, cause an actuation of the hydraulic brakes of the vehicle.

Figure 2:
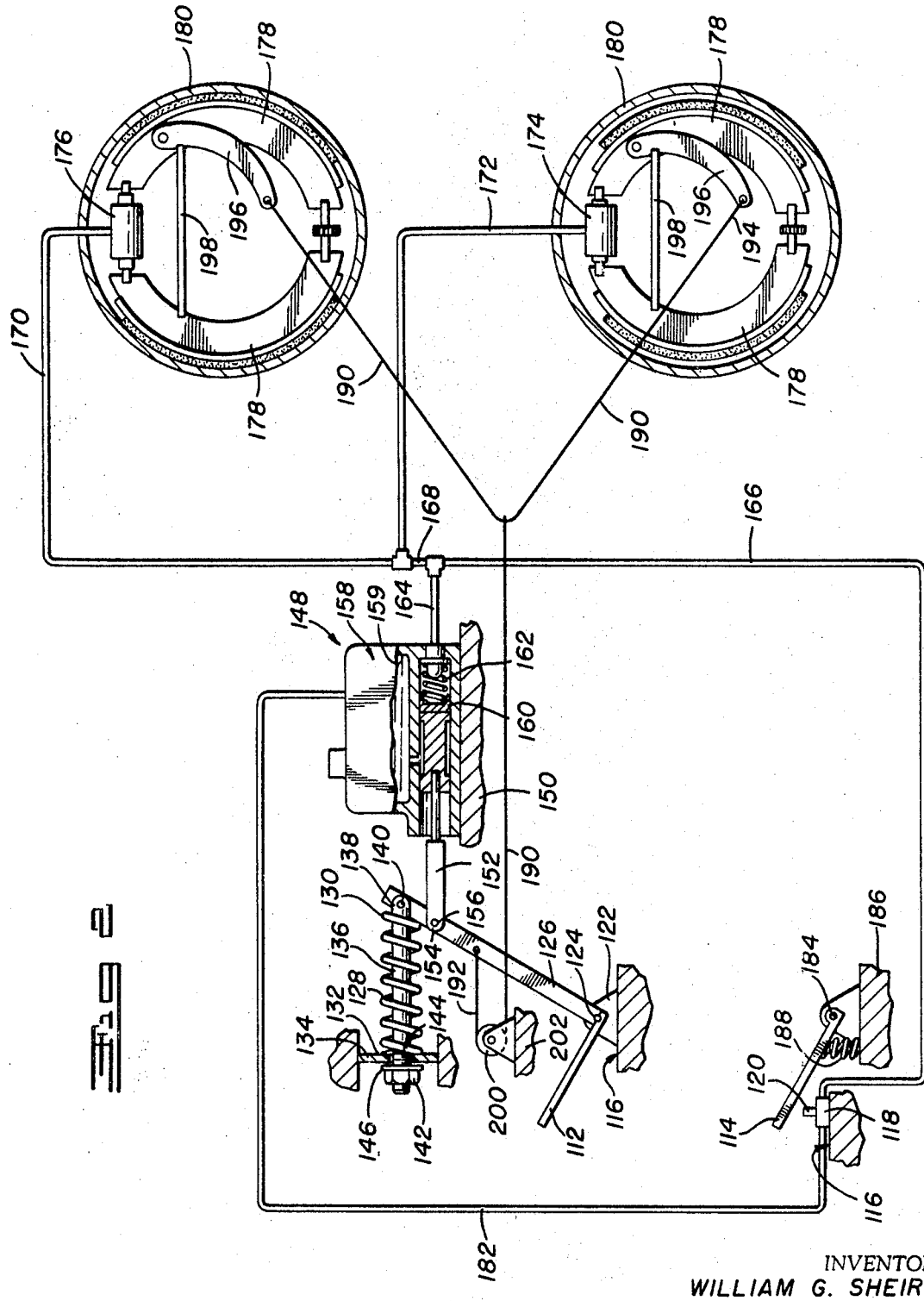
FIG. 2 is a schematic illustration of the brake system comprising the invention of the present case.

As can be better seen in FIG. 2, depression of the deadman treadle 114 serves to close a normally open hydraulic valve 118 such as by movement of a valve closing stem 120.

In order to better describe the operation of the brake system of the present invention, applicant will now describe the various elements of the system and the relationship of each element to the brake system.

The brake system of the present invention comprises the service brake pedal 112 pivotally mounted to a portion 122 of the vehicle 100 and is adapted to be relatively pivoted in either direction of rotation about a shaft 124. The pedal 112 is operatively associated with a lever 126 in a manner such that pivotal movement of the pedal 112 results in a corresponding pivotal movement of the lever 126. The lever 126 is biased to the position shown in FIG. 2 by a resilient member 128.

The resilient member 128 is at one end 130 supported by the lever 126 and at the other end 132 by a portion 134 of the vehicle 100. The resilient member 128 and the maximum displacement thereof is controlled by a rod 136 which is at one end 138 attached to the lever 126 by a pin 140, said pin 140 allowing relative pivotal movement between the rod 136 and the lever 126. The other end 142 of the rod 136 extends through an opening 144 in the portion 134 of the vehicle 100. Means 146 such as a threaded fastener having a dimension larger than the dimension of the opening 144 is provided for purposes of prdetermining the maximum displacement of the lever 126 by the resilient means 128. The opening 144 is sufficiently larger than the rod 136 so as to permit slight angular misalignment of the rod 136 during movement thereof.

Also operatively associated with the lever 126 is a hydraulic brake master cylinder designated generally as 148. For purposes of discussion with respect to the operation of the brake system shown in FIG. 2, it is sufficient to state that the master cylinder 148 is fixedly attached to a portion 150 of the vehicle 100 and comprises a piston actuating rod 152, one end 154 of which is pivotally secured to the lever 126 by a pin member 156. It can be seen, therefore, that as the pedal 112 is relatively pivoted with respect to the portion 122 of the vehicle 100 the piston actuating rod 152 is moved with respect to the body 158 of the master cylinder 148 in a generally horizontal plane. As is conventional in all hydraulic master cylinder brake systems, movement of the piston actuating rod 152 results in a corresponding movement of a hydraulic fluid pressurizing piston. As the piston 160 actuating rod 152 is moved to the right, the hydraulic fluid pressurizing piston 160 is moved a corresponding amount with the result that hydraulic fluid contained within a chamber defined by the body 158 of the hydraulic master cylinder 148 is pressurized and, due to the incompressible nature of the hydraulic fluid utilized in hydraulic brake systems, the pressure generated is transmitted through the fluid throughout the remainder of the hydraulic brake system.

Referring again to FIG. 2, if the service brake pedal 112 were depressed by the operator so as to assume a position immediately adjacent the portion 116 of the vehicle 100, the piston actuating rod 152 would be moved to the left from the body 158 of the master cylinder 148 to a position whereat the hydraulic pressure would be relieved. With the brake pedal 112 in the position as shown in FIG. 2, the piston actuating rod 152 and the piston 160 would be in a position that would represent the maximum displacement of the piston 160 in the maximum fluid displacement position. Disregarding for a moment the presence of the normally open valve member 118 in the system; with the lever 126 biased by the resilient member 128 to the position shown in FIG. 2, the hydraulic pressure created by the force of the biasing member 128 would be transmitted from the chamber 162 of the master cylinder 148 through a plurality of hydraulic fluid conduits 164, 168, 170 and 172 to the brake actuating wheel cylinders 174 and 176 whereat the hydraulic fluid pressure is transformed, in a well known manner, through a pair of pistons in each of the wheel cylinders 174 and 176 into linear movement for causing generally outward movement of the brake shoes 178 into engagement with a rotatable brake drum 180 and will, due to well known braking principles, retard the movement of the vehicle 100 or retain the vehicle in a stationary position if the brakes are thus applied. Also in fluid communication with the master cylinder through the hydraulic fluid conduit 164 is a hydraulic conduit 166 which places the normally open valve 118 in fluid communication with the master cylinder pressure. Fluid pressure to the normally open valve 118 is returned to a hydraulic fluid reservoir 159 associated with the master cylinder 148 through a hydraulic conduit 182. It is thus apparent that with the normally opened valve 118 in the position shown in FIG. 2, the hydraulic pressure resulting from the biasing of the piston actuating rod 152 and the accompanying piston 160 due to the force of the resilient member 128 is relieved by the unpressurized fluid passage existing in the hydraulic circuit comprising the conduit 164, conduit 166, the normally open valve 118, the conduit 182 and the hydraulic fluid reservoir 159 of the master cylinder 148. Further, in connection with the operation of the hydraulic brake system, it is to be noted that if the pedal 114 were depressed, such as by an operator standing thereon, the pedal 114 would be pivoted about a shaft 184 mounted on a portion 186 of the vehicle 100.

The weight of the operator standing on the pedal 114 would overcome the biasing force of the resilient member 188 which serves to normally bias the pedal 114 out of engagement with the normally open valve member 118. The weight of the vehicle operator would thus pivot the pedal 114 toward the portion 116 of the vehicle 100 and would, in the course of pivoting movement, contact the stem 120 of the normally open valve 118 and cause a downward motion thereof, which motion would result in the closing of the normally open valve 118. With the valve 118 thus closed, the unpressurized hydraulic circuit from the master cylinder 148 to the master cylinder reservoir 159 would then not exist and hydraulic pressure caused by the urging of the resilient means 128 on the lever 126 and the resultant movement of the piston actuating rod 152 and piston 160 would result in the pressurization of the hydraulic circuit comprising conduit 164, conduit 168, conduit 170 and conduit 172 and the respective wheel cylinders 174 and 176 with the final result that the brake shoes 178 will be forced into engagement with the brake drums 180 due to the linear movement received from the wheel cylinders 174 and 176. This hydraulic actuation of the brake shoes 178 is the normal mode of operation for retarding the forward or reverse motion of the vehicle so long as the operator maintains his weight on the deadman treadle 114 and the normally open valve 118 is thereby retained in a closed condition and hydraulic fluid flow therethrough prevented.

It is to be further noted, however, that the vehicle 100 is also provided with an emergency or parking brake system which is also actuated by the pivotal movement of the lever 126.

The emergency or parking brake comprises a flexible cable 190 attached at one end 192 to the lever 126 for movement therewith and attached at the other end 194 to a parking brake actuating lever 196. The parking brake actuating lever 196 is pivotally attached to one of the brake shoes 178 is operatively associated with the other of the brake shoes 178 through a balance rod 198. In the embodiment shown in FIG. 2, the cable direction is reversed about a pulley member 200 which is rotatably secured to a portion 202 of the vehicle 100. It can be seen in FIG. 2 that as the lever 126 moves to the right under the biasing influence of the resilient member 128, the cable 190 is moved therewith, there of course being a change in direction due to the looping of the cable 190 about the pulley 200.

Movement of the lever 126 and the accompanying movement of the cable 190 to the right in FIG. 2 results in the parking brake actuating lever 196 being moved to the position shown in FIG. 2 which in turn results in the mechanical application of the brakes through the intermediate balance member 198 with the result that both of the brake shoes 178 are forced into engagement with the brake drum 180.

Figure 3:
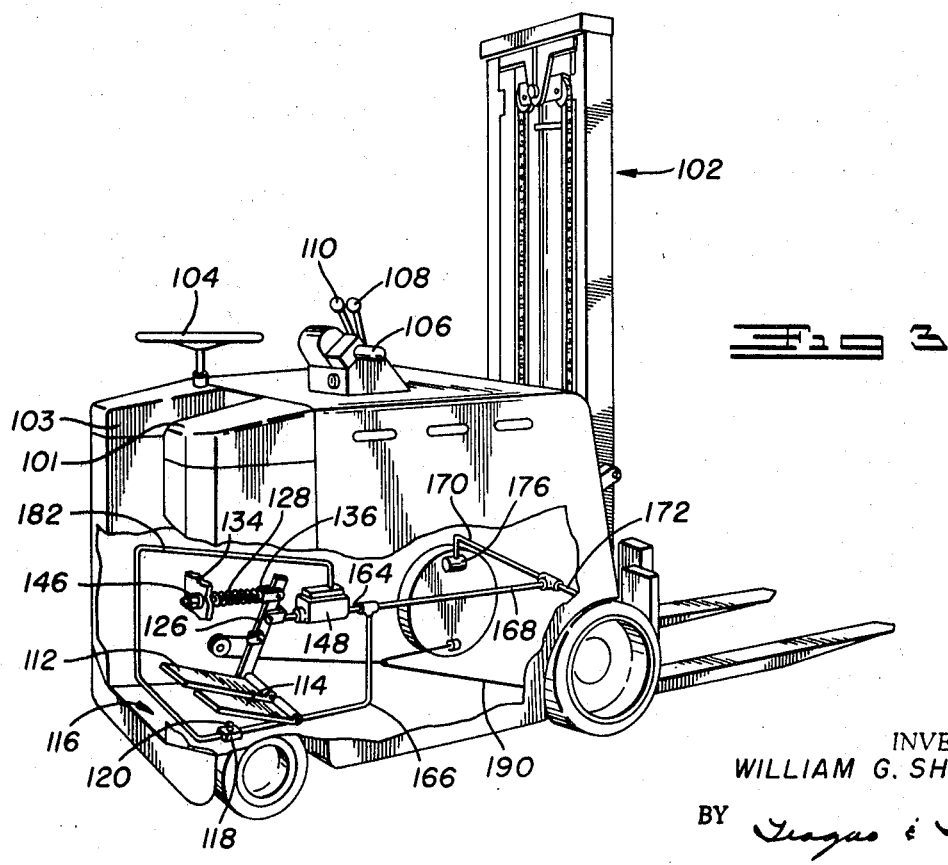
FIG. 3 illustrates the brake system shown in FIG. 2 installed in the vehicle of FIG. 1.

In FIG. 3 the brake system of FIG. 2 is illustrated in position as it would be installed on an industrial lift truck. The operation of the present brake system will be described with reference to FIG. 3.

In the particular lift truck shown, the operator would mount the vehicle 100 between the counterweights 101 and 103 placing one foot on each of the respective service brake pedal 112 and emergency or parking brake pedal 114, thus depressing the pedals 112 and 114 against the portion 116 of the vehicle 100. With the pedals 112 and 114 thus depressed against the portion 116 of the vehicle 100, both the hydraulic and the emergency or parking brake systems are released and the vehicle 100 is free to move in either direction of travel. Further depression of the emergency or parking brake pedal 114 closes the normally open valve member 118 by depression of the stem 120 during a portion of the pivotal movement of the parking brake pedal 114. The closing of the valve member 118 readies the hydraulic circuit comprising the master cylinder 148, the hydrauluic conduits 164, 168, 170 and 172 and the wheel cylinders 174 and 176 to permit actuation thereof upon the occurrence of a predetermined event, namely, the release of the service brake pedal 112.

Depression of the service brake pedal 112 due to the weight of the vehicle operator thereon pivots the lever 126 in a counterclockwise direction from that shown in FIG. 3 against the biasing force of the resilient member 128.

Assuming that the vehicle operator has started the vehicle 100 in motion in either direction of travel and now desires to brake the vehicle, the operator would then remove his weight from the service brake pedal 112 and allow it to be pivoted upward by the biasing force of the resilient member 128. The movement of the lever 126 caused by the biasing force results, due to movement of the piston rod 152, in a pressurization of the hydraulic circuit and an actuation of the service brakes. As can be readily understood from an understanding of a hydraulic brake system, once the brake shoes 178 are forced into engagement with the brake drums 180 movement of the piston actuating rod 152 is stopped and the biasing force of the resilient member 128 results only in increase in pressure in the hydraulic circuit with no accompanying movement of the piston 160 in view of the incompressible nature of the hydraulic brake fluid. Thus, during normal operation of the service brakes the piston 160 actuating rod 152 is stopped at a position short of the maximum displacement position shown in FIG. 2 with the result that the emergency or parking brake cable 190 is not moved by the lever 126 a sufficient distance to cause actuation of the parking brake system as described above. Thus, it can be seen that normal retardation of vehicle movement is accomplished through actuation of the hydraulic brake system, also referred to as the service brake system, which is the ordinary and normal operation for which the service brake system was designed.

However, it can also be seen that if there exists a leak or break in the hydraulic circuit the lever 126 would continue to move past the point of normal actuation of the service brake with the resultant actuation of the emergency or parking brake due to the tensioning of the cable 190 as described above.

Thus, it can be seen that although normal braking of the vehicle 100 is accomplished through the use of the service brake system the invention of the present case also contemplates the automatic application of the emergency or parking brake in the event of a failure of the hydraulic system.

It is further contemplated as a feature of this invention that even though the service brake system is operating in a normal manner for purposes of retarding vehicle movement, when the vehicle 100 is brought to a complete stop through the operation of the service brakes and the vehicle operator then desires to leave the vehicle parked and dismounts from the vehicle by removing his weight from both the service brake pedal 112 and the emergency or parking brake pedal 114, that the parking or emergency brake system will be applied and the hydraulic pressure existing in the circuit 164, 166, 168, 170, 172 and the wheel cylinders 174 and 176 will be relieved by the upward pivotal movement of the parking brake pedal 114 due to the biasing force of a resilient member 188 and the consequent opening of the normally open valve member 118 due to the removal of force from the stem 120 of the valve 118. With the vehicle operator thus removed from the vehicle, the emergency or parking brake system is applied through the tensioning of the cable 190 which results from the continued movement of the lever 126 under the biasing force exerted by the resilient member 128 thereon.

In FIG. 4 there is illustrated another embodiment of the invention of the present case. The operation of the hydraulic service brake system in FIG. 4 is identical with that illustrated in FIG. 2. However, the parking or emergency brake as illustrated in FIG. 4 comprises a band type brake 206 secured to a portion 208 of the vehicle 100. The band brake 206 operates to retard the rotation of a shaft 204 of a wheel driving electric motor 200 in response to tensioning of a cable 210. The shaft 204 is an extension of the armature of the driving motor 200 as is shaft 202 which is drivingly associated with a traction wheel 105 of the vehicle 100. Therefore with the operation of the pedals 112 and 114 operating in a manner identical to that described with respect to FIG. 2 it can be seen since the cable 210 is connected to the lever 126 that excessive movement of the piston 160 to the right in FIG. 4 due to either the operation of the pressure relief valve assembly 118 or the excessive wear of the lining of the service brake 178 the cable 210 will be tensioned and the parking or emergency brake 206 applied.

It can thus be seen that through the utilization of the concept of the present invention that an effective service brake for a moving vehicle is contemplated while further providing a fail-safe mechanical actuation of the parking or emergency brake in the event of a failure or undue wear condition existing in the hydraulic brake system and still further it can be appreciated that once the vehicle has been brought to a stop through the normal application of the service brake system and it is then desired to leave the stopped vehicle parked without an attendant, that the parking or emergency brake will be automatically and immediately applied while the pressurization of the service brake system will be automatically relieved and the attendant disadvantages resulting from long term pressurization of the hydraulic system as described above removed.

Having thus described my invention and a preferred embodiment thereof, it will be immediately recognized that I have made a significant contribution to the art for which patent protection is earnestly sought in the form of the appended claim.

I now claim:
1. A brake system for a wheeled vehicle comprising:
 a wheel brake;
 a hydraulic cylinder mounted on said vehicle for actuating the wheel brake;
 a hydraulic master cylinder, including a fluid reservoir and a movable piston for supplying hydraulic fluid to the wheel cylinder;
 a conduit interconnecting the master cylinder with the wheel cylinder and the reservoir;
 a normally open control valve located in the conduit between the master cylinder and the reservoir, the valve normally permitting the free flow of hydraulic fluid from the master cylinder to the reservoir and preventing hydraulic actuation of the wheel brake;
 a movable actuator including a pivotal treadle mounted on the vehicle and operatively associated with the valve for closing the valve to permit hydraulic actuation of the wheel brake, said treadle being resiliently biased to a first inoperative position allowing said valve to assume the normally open position and pivotal to a second position for moving the actuator and closing the valve;
 a lever mounted on the vehicle and operatively associated with the master cylinder piston to cause movement thereof between an inoperative and an operative position within the master cylinder;
 means mounted on the vehicle normally biasing the lever and master cylinder piston to an operative position; and
 a mechanical connection between the wheel brake and the lever whereby the wheel brake will be mechanically actuated by movement of the lever and master cylinder piston to an operative position.

References Cited
UNITED STATES PATENTS

| | | | |
|---|---|---|---|
| 1,729,015 | 9/1929 | Seidman. | |
| 3,333,902 | 8/1967 | Liverance et al. | 188—106 |
| 3,424,281 | 1/1969 | Kawabe et al. | 188—106 |
| 3,190,401 | 6/1965 | Bigley et al. | 188—167 |

FOREIGN PATENTS 612,972 1/1961 Canada.

GORGE E. A. HALVOSA, Primary Examiner

U.S. Cl. X.R.

188—166